(12) United States Patent
Lin et al.

(10) Patent No.: US 10,923,120 B2
(45) Date of Patent: Feb. 16, 2021

(54) HUMAN-MACHINE INTERACTION METHOD AND APPARATUS BASED ON ARTIFICIAL INTELLIGENCE

(71) Applicant: BEIJING BAIDU NETCOM SCIENCE AND TECHNOLOGY CO., LTD., Beijing (CN)

(72) Inventors: Yingzhan Lin, Beijing (CN); Zeying Xie, Beijing (CN); Yichuan Liang, Beijing (CN); Wenmin Wang, Beijing (CN); Yin Zhang, Beijing (CN); Guang Ling, Beijing (CN); Chao Zhou, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 200 days.

(21) Appl. No.: 16/054,671

(22) Filed: Aug. 3, 2018

(65) Prior Publication Data

US 2019/0088256 A1    Mar. 21, 2019

(30) Foreign Application Priority Data

Sep. 19, 2017    (CN) .......................... 2017 1 0851590

(51) Int. Cl.
*G10L 15/22* (2006.01)
*G10L 15/26* (2006.01)
*G10L 15/06* (2013.01)
*G06F 16/33* (2019.01)

(52) U.S. Cl.
CPC .......... *G10L 15/22* (2013.01); *G06F 16/3334* (2019.01); *G10L 15/063* (2013.01); *G10L 15/26* (2013.01); *G10L 2015/0631* (2013.01); *G10L 2015/223* (2013.01); *G10L 2015/225* (2013.01)

(58) Field of Classification Search
CPC ............................. G10L 15/22; G06F 16/9537
USPC .......................................................... 704/257
See application file for complete search history.

(56) References Cited

U.S. PATENT DOCUMENTS

| | | | | |
|---|---|---|---|---|
| 6,742,021 B1 * | 5/2004 | Halverson | .............. | G06N 5/043 709/218 |
| 7,467,147 B2 * | 12/2008 | Irish | ...................... | G06F 16/954 |
| 7,698,062 B1 * | 4/2010 | McMullen | ....... | G08G 1/096844 701/438 |
| 7,762,687 B2 * | 7/2010 | Lu | .......................... | F21V 29/60 362/285 |

(Continued)

FOREIGN PATENT DOCUMENTS

CN    105426436 A    3/2016
CN    106294582 A    1/2017

(Continued)

*Primary Examiner* — Susan I McFadden
(74) *Attorney, Agent, or Firm* — Nixon Peabody LLP

(57) ABSTRACT

A human-machine interaction method and apparatus based on artificial intelligence. In the method, a user-entered interaction sentence is received, and whether to generate an interaction result corresponding to the interaction sentence is determined; and interaction information to be presented to the user is determined based on a determining result, the interaction information including at least one of following items: the generated interaction result corresponding to the interaction sentence, or a search result corresponding to the interaction sentence in a search engine.

9 Claims, 5 Drawing Sheets

(56) References Cited

U.S. PATENT DOCUMENTS

| | | | | |
|---|---|---|---|---|
| 9,177,553 | B1* | 11/2015 | Uszkoreit | G10L 15/22 |
| 9,292,556 | B2* | 3/2016 | Walkling | G06F 16/2246 |
| 9,430,945 | B2* | 8/2016 | Eich | G08G 1/096861 |
| 9,431,012 | B2* | 8/2016 | Fry | G10L 15/19 |
| 10,021,454 | B2* | 7/2018 | Fan | H04L 65/4092 |
| 10,108,700 | B2* | 10/2018 | Gupta | G06F 16/3331 |
| 10,247,570 | B2* | 4/2019 | Aben | G06F 16/9537 |
| 10,275,403 | B2* | 4/2019 | James | G06F 16/24554 |
| 10,447,966 | B2* | 10/2019 | Ritchey | H04N 7/15 |
| 10,469,393 | B1* | 11/2019 | Briscoe | H04L 47/24 |
| 2003/0084098 | A1* | 5/2003 | Lavin | H04L 29/12009 |
| | | | | 709/203 |
| 2010/0100310 | A1* | 4/2010 | Eich | G01C 21/3661 |
| | | | | 701/533 |
| 2011/0210867 | A1* | 9/2011 | Benedikt | G08G 1/096725 |
| | | | | 340/905 |
| 2018/0240347 | A1* | 8/2018 | Shamasundar | G08G 5/0026 |

FOREIGN PATENT DOCUMENTS

| | | |
|---|---|---|
| CN | 106992009 A | 7/2017 |
| CN | 105513593 A | 9/2019 |

\* cited by examiner

HUMAN-MACHINE INTERACTION METHOD AND APPARATUS BASED ON ARTIFICIAL INTELLIGENCE

CROSS-REFERENCE TO RELATED APPLICATIONS

This application claims priority to Chinese Patent Application No. 201710851590.2, filed on Sep. 19, 2017, titled "Human-machine Interaction Method and Apparatus based on Artificial Intelligence," which is hereby incorporated by reference in its entirety.

TECHNICAL FIELD

The disclosure relates to the field of computer technology, specifically to the field of human-machine interaction, and more specifically to a human-machine interaction method and apparatus based on artificial intelligence.

BACKGROUND

Rapid development of artificial intelligence (AI) facilitates daily work and life. Artificial intelligence is a new technical science that studies and develops theories, methods, techniques and application systems for simulating, extending and expanding human intelligence. Artificial intelligence is a branch of the computer science that attempts to understand the essence of intelligence and produces new intelligent machinery capable of responding in a way similar to human intelligence. Studies in the field include robots, speech recognition, image recognition, natural language processing, expert systems, and the like. Artificial intelligence is increasingly more integrated into human-machine interaction. Human-machine interaction based on artificial intelligence may analyze user needs, and send, after a user inputs an interaction sentence, feedback on user-desired interaction information to the user. At present, in order to generate interaction information to be fed back to a user, a commonly used method is: pre-establishing different types of databases for generating interaction information vis-à-vis different types of interaction sentences.

However, as a result of the diversity of interaction sentences and mass data required for generating interaction information, it is impossible to establish a perfect database for each type of interaction sentence, leading to the inability to provide, after a user enters some types of interaction sentences, the user-desired interaction information to the user.

SUMMARY

The disclosure provides a human-machine interaction method and apparatus based on artificial intelligence, to solve the technical problems existing in the background part.

In a first aspect, the disclosure provides a human-machine interaction method based on artificial intelligence, the method including: receiving a user-entered interaction sentence, and determining whether to generate an interaction result corresponding to the interaction sentence; and determining interaction information to be presented to the user based on a determining result, the interaction information including at least one of: the generated interaction result corresponding to the interaction sentence, or a search result corresponding to the interaction sentence in a search engine.

In a second aspect, the disclosure provides a human-machine interaction apparatus based on artificial intelligence, the apparatus including: an interaction unit, configured for receiving a user-entered interaction sentence, and determining whether to generate an interaction result corresponding to the interaction sentence; and a determining unit, configured for determining interaction information to be presented to the user based on a determining result, the interaction information including at least one of: the generated interaction result corresponding to the interaction sentence, or a search result corresponding to the interaction sentence in a search engine.

With the human-machine interaction method and apparatus based on artificial intelligence provided by the disclosure, a user-entered interaction sentence is received, and whether to generate an interaction result corresponding to the interaction sentence is determined; and interaction information to be presented to the user is determined based on a determining result, the interaction information including at least one of: the generated interaction result corresponding to the interaction sentence, or a search result corresponding to the interaction sentence in a search engine. As such, only a database required for generating an interaction result corresponding to an interaction sentence of a core type is established, to generate the interaction result corresponding to the interaction sentence of the core type as interaction information to be presented to the user, and for an interaction sentence of a universal type, a search result corresponding to the interaction sentence in a search engine is acquired and used as the interaction information to be presented to the user. Thus, interaction information corresponding to of interaction sentences of various types is provided to the user whilst overheads for establishing a database for generating the interaction information is saved.

BRIEF DESCRIPTION OF THE DRAWINGS

Other features, objectives and advantages of the present disclosure will become more apparent upon reading the detailed description to non-limiting embodiments with reference to the accompanying drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
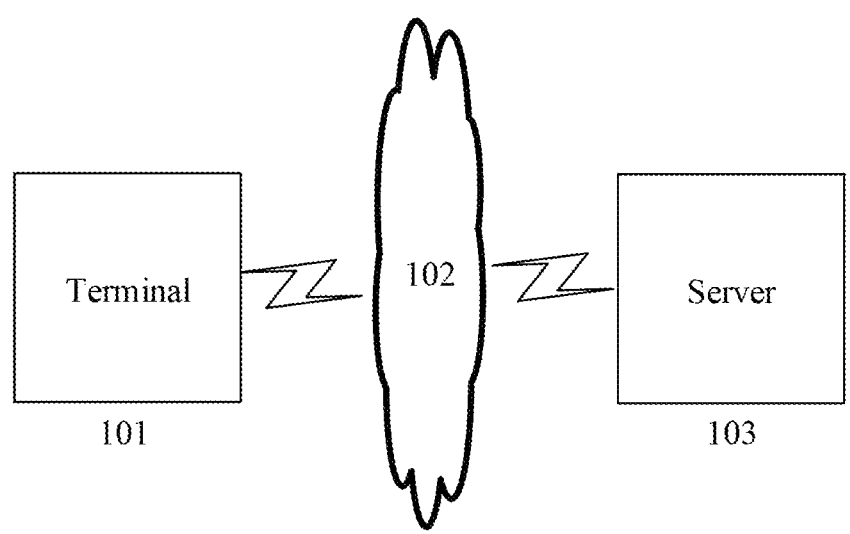
FIG. 1 is an architectural diagram of an exemplary system in which a human-machine interaction method or apparatus based on artificial intelligence according to the disclosure may be implemented.

FIG. 1 is an architectural diagram of an exemplary system in which a human-machine interaction method or apparatus based on artificial intelligence according to the disclosure may be implemented.

As shown in FIG. 1, the system architecture may include a terminal 101, a network 102, and a server 103. The network 102 is used for providing a communication link medium between the terminal 101 and the server 103. The network 102 may include, but is not limited to: a 3G, LTE or 4G network.

The terminal 101 may include, but is not limited to: a smart phone, a tablet computer, and a vehicle terminal. The server 103 is a server for running a search engine. The server 103 may receive a request sent by the terminal 101, find a search result in the search engine corresponding to an interaction sentence entered by a user of the terminal 101, and send the search result corresponding to the interaction sentence to the terminal 101.

Figure 2:
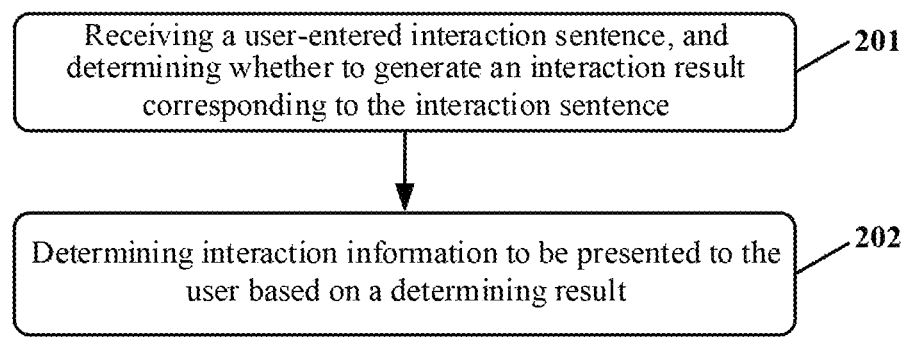
FIG. 2 is a flowchart of a human-machine interaction method based on artificial intelligence according to an embodiment of the present disclosure.

Reference is made to FIG. 2, which shows a flowchart of a human-machine interaction method based on artificial intelligence according to an embodiment of the present disclosure. It should be noted that the human-machine interaction method based on artificial intelligence according to an embodiment of the disclosure may be executed by a terminal (for example, the terminal 101 in FIG. 1), and accordingly, the human-machine interaction apparatus based on artificial intelligence may be arranged in the terminal (for example, the terminal 101 in FIG. 1). The method includes steps 201 to 202.

Step 201 includes: receiving a user-entered interaction sentence, and determining whether to generate an interaction result corresponding to the interaction sentence.

In the embodiment, the user-entered interaction sentence may be received by the terminal. For example, when a user needs navigation, a user-entered interaction sentence, e.g., "shortest-time route from . . . to . . . " may be received by a vehicle terminal.

In some optional implementations of the embodiment, the terminal, e.g., the vehicle terminal, may receive a user-entered voice, and recognize the user-entered voice to obtain a sentence corresponding to the user-entered voice, thereby obtaining the user-entered interaction sentence.

In the embodiment, after receiving the user-entered interaction sentence via the terminal, whether to generate the interaction result corresponding to the user-entered interaction sentence may be determined. Determining whether to generate the interaction result corresponding to the user-entered interaction sentence may refer to determining whether to generate the interaction result corresponding to the user-entered interaction sentence in the terminal.

For example, after the vehicle terminal receives the user-entered interaction sentence "shortest-time route from . . . to . . . ," whether to generate the interaction result corresponding to the interaction sentence in the vehicle terminal may be determined, and the interaction result corresponding to the interaction sentence may be a shortest-time route from . . . to . . . . For another example, after the vehicle terminal receives a user-entered interaction sentence "switching on an air conditioner," whether to generate the interaction result corresponding to the interaction sentence in the vehicle terminal may be determined, and the interaction result corresponding to the interaction sentence may be a returned message indicating successfully switching on the air conditioner after switching on the air conditioner on a vehicle equipped with the vehicle terminal.

In some optional implementations of the embodiment, when determining whether to generate the interaction result corresponding to the interaction sentence, whether there is a template of a core type matching the user-entered interaction sentence may be determined. Determining whether there is the template of the core type matching the user-entered interaction sentence may refer to determining whether the terminal includes the template of the core type matching the user-entered interaction sentence. The core type may include a navigation type, a control type, and the like. The user-entered interaction sentence may also belong to the core type. For example, the type of the user-entered interaction sentence "shortest-time route from . . . to . . . " is the navigation type, and the type of the user-entered interaction sentence "switching on an air conditioner" is a control type. A plurality of templates of core types may be pre-stored in the terminal. Accordingly, respective databases of data required for generating interaction results corresponding to respective types of interaction sentences may be pre-established in the terminal.

For example, templates of the navigation type, such as "shortest-time route from . . . to . . . " and "whether there is a filling station on a way from . . . to . . . ", and templates of the control type, such as "switching on . . . " and "switching off . . . " may be pre-stored in the vehicle terminal. A navigation database of map data required for generating an interaction result corresponding to an interaction sentence of the navigation type and a control database of a control instruction required for generating an interaction result corresponding to an interaction sentence of the control type are pre-established in the vehicle terminal.

When there is no template of the core type matching the user-entered interaction sentence, it may be determined that no interaction result corresponding to the user-entered interaction sentence is generated. When there is a template of the core type matching the user-entered interaction sentence, a keyword in the user-entered interaction sentence may be extracted using an extraction method corresponding to the template of the core type matching the interaction sentence; an interaction result corresponding to the user-entered interaction sentence may be generated based on the extracted keyword and the database of the core type; and the generated interaction result corresponding to the interaction sentence may be determined.

For example, the type of the user-entered interaction sentence is a weather type, rather than the navigation type and the control type of the core type. Accordingly, when the terminal does not include template of the core type matching the interaction sentence, it may be determined that no interaction result corresponding to the user-entered interaction sentence is generated. When a user inputs a navigation-type interaction sentence "shortest-time route from Houhai to Wangfujing", the template "shortest-time route from . . . to . . . " of the navigation type is matched, i.e., the interaction sentence corresponds to the core type, keywords "Houhai", "Wangfujing" and "shortest-time route" may be extracted from the interaction sentence using an extraction method corresponding to the template of the core type, a shortest-time route from Houhai to Wangfujing may be found out from the established database of map data required for generating the interaction result corresponding to the interaction sentence of the navigation type to generate the interaction result corresponding to the user-entered interaction sentence, i.e., the shortest-time route from Houhai to Wangfujing.

Step 202 includes: determining interaction information to be presented to the user based on the determining result.

In the embodiment, after determining whether to generate the interaction result corresponding to the user-entered interaction sentence in the step 201, i.e., after determining whether to generate the interaction result corresponding to the user-entered interaction sentence in the terminal, the interaction information corresponding to the interaction sentence and to be presented to the user may be determined based on the determining result. The interaction information corresponding to the interaction sentence and to be presented to the user includes at least one of: the generated interaction result corresponding to the interaction sentence, or a search result corresponding to the interaction sentence in a search engine.

In the embodiment, after receiving the user-entered interaction sentence, when the interaction result corresponding to the user-entered interaction sentence may be generated, i.e., when the interaction result corresponding to the user-entered interaction sentence may be generated in the terminal, the interaction result corresponding to the user-entered interaction sentence may be used as the interaction information to be presented to the user. Furthermore, the terminal may send the user-entered interaction sentence to a server running the search engine. The server running the search engine can find a search result corresponding to the user-entered interaction sentence in the search engine, and send the search result corresponding to the user-entered interaction sentence in the search engine to the terminal, so that the search result corresponding to the interaction sentence in the search engine may be used as the interaction information to be presented to the user. After receiving the user-entered interaction sentence, when the interaction result corresponding to the user-entered interaction sentence cannot be generated, i.e., when the interaction result corresponding to the user-entered interaction sentence cannot be generated in the terminal, the terminal may send the user-entered interaction sentence to the server running the search engine. The server running the search engine may find the search result corresponding to the user-entered interaction sentence in the search engine, and send the search result corresponding to the user-entered interaction sentence in the search engine to the terminal, so that the search result corresponding to the interaction sentence in the search engine may be used as the interaction information to be presented to the user.

In some optional implementations of the embodiment, after receiving the user-entered interaction sentence, when generating the interaction result corresponding to the interaction sentence, the generated interaction result corresponding to the interaction sentence may be used as the interaction information to be presented to the user. When a plurality of interaction results corresponding to the interaction sentence are generated, the plurality of interaction results corresponding to the interaction sentence may be sorted, and then presented to the user. When no interaction result corresponding to the interaction sentence is generated, the search result corresponding to the user-entered interaction sentence in the search engine may be used as the interaction information to be presented to the user. A plurality of search results in the search engine may correspond to the user-entered interaction sentence.

After sending the user-entered interaction sentence to the server running the search engine, the terminal may receive a plurality of sorted search results corresponding to the user-entered interaction sentence in the search engine sent by the server running the search engine, and may use the plurality of sorted search results corresponding to the user-entered interaction sentence in the search engine as the interaction information to be presented to the user.

For example, when the user enters an interaction sentence of the navigation type "shortest-time route from . . . to . . . ," the template of the navigation type may be matched, the interaction result corresponding to the interaction sentence may be further generated, and then the generated interaction result corresponding to the interaction sentence may be presented to the user as interaction information to be presented to the user. When the user-entered interaction sentence is "why a speed is limited in a road segment from . . . to . . . ", the type of the interaction sentence belongs to a universal questions and answers type. In general, the user usually enters the interaction sentence in the search engine. As a result, the terminal can not generate the interaction result corresponding to the interaction sentence, needs to acquire the search result corresponding to the interaction sentence in the search engine, and then presents the search result corresponding to the interaction sentence in the search engine to the user as the interaction information to be presented to the user.

In some optional implementations of the embodiment, before determining whether to generate the interaction result corresponding to the interaction sentence, the user-entered interaction sentence may be sent to the server running the search engine, and a found search result corresponding to the interaction sentence in the search engine sent by the server running the search engine may be received. Thus, the search result corresponding to the user-entered interaction sentence in the search engine may be pre-acquired, and when the terminal fails to generate the interaction result corresponding to the interaction sentence, the pre-acquired search result corresponding to the user-entered interaction sentence in the search engine may be directly presented to the user as the interaction information to be presented to the user.

Figure 3:
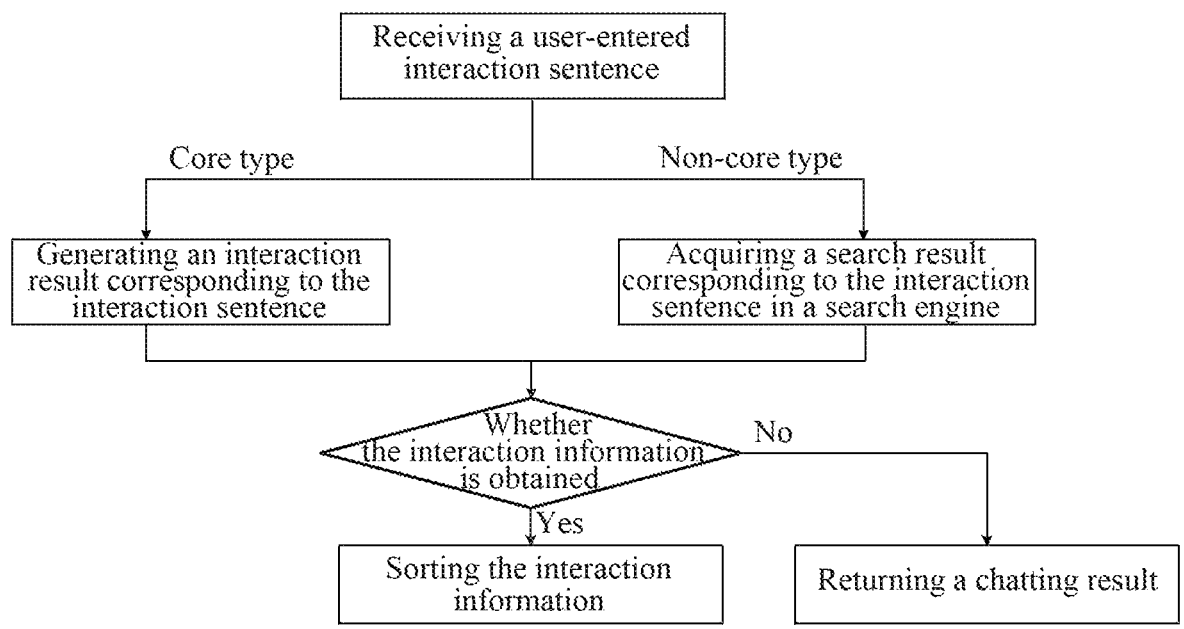
FIG. 3 is an exemplary flowchart of a human-machine interaction method based on artificial intelligence according to an embodiment of the present disclosure.

Reference is made to FIG. 3, which shows an exemplary flowchart of a human-machine interaction method based on artificial intelligence according to an embodiment of the present disclosure.

First, a user-entered interaction sentence is received. Taking a preset type being a navigation type of a core type as an example, an interaction sentence entered by a user via a keyboard, voice input, or the like may be received by a terminal. When the type of the user-entered interaction sentence is the navigation type of the core type, for example, when the user enters an interaction sentence "what is the shortest-time route from . . . to . . . " of the navigation type, an interaction result corresponding to the user-entered interaction sentence may be generated, and the generated interaction result corresponding to the user-entered interaction sentence may be used as interaction information to be presented to the user. When the type of the user-entered interaction sentence is not the core type, a search result corresponding to the interaction sentence in the search engine is acquired, and the search result corresponding to the interaction sentence is used as the interaction information to be presented to the user.

Figure 4:
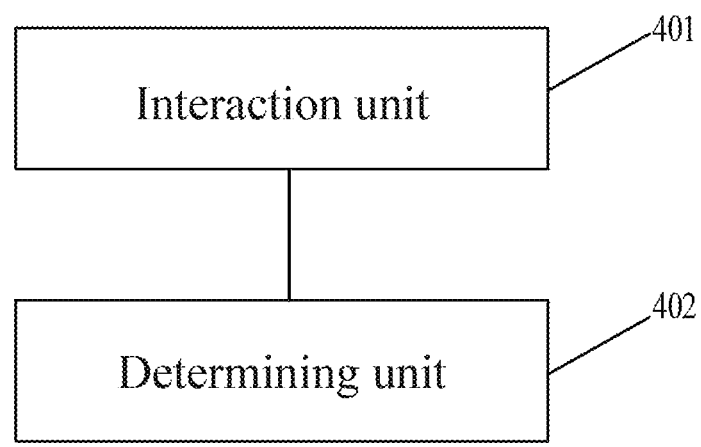
FIG. 4 shows a structural schematic diagram of a human-machine interaction apparatus based on artificial intelligence according to an embodiment of the present disclosure.

Referring to FIG. 4, as implementations of the methods shown in the above figures, a structural schematic diagram of a human-machine interaction apparatus based on artificial intelligence is provided according to an embodiment of the present disclosure. The embodiment of the apparatus corresponds to the embodiment of the method as shown in FIG. 2.

As shown in FIG. 4, the human-machine interaction apparatus based on artificial intelligence includes: an interaction unit 401 and a determining unit 402. The interaction unit 401 is configured for receiving a user-entered interaction sentence, and determining whether to generate an interaction result corresponding to the interaction sentence; and the determining unit 402 is configured for determining interaction information to be presented to the user based on a determining result, the interaction information including at least one of: the generated interaction result corresponding to the interaction sentence, or a search result corresponding to the interaction sentence in a search engine.

In some optional implementations of the embodiment, the determining unit 402 is further configured for: using, the generated interaction result corresponding to the interaction sentence as the interaction information to be presented to the user if the interaction result corresponding to the interaction sentence is generated; and using the search result corresponding to the interaction sentence in the search engine as the interaction information to be presented to the user, if no interaction result corresponding to the interaction sentence is generated.

In some optional implementations of the embodiment, the interaction unit 401 is further configured for: determining whether there is a template of a core type matching the user-entered interaction sentence; determining that no interaction result corresponding to the interaction sentence is generated, if there is no template of the core type matching the user-entered interaction sentence; and extracting a keyword in the user-entered interaction sentence using an extraction method corresponding to the template of the core type, if there is the template of the core type matching the user-entered interaction sentence, generating the interaction result corresponding to the user-entered interaction sentence based on the extracted keyword and a database of the core type, and determining the generated interaction result corresponding to the user-entered interaction sentence.

In some optional implementations of the embodiment, the interaction unit 401 is further configured for: receiving user-entered voice information; converting the voice information into corresponding text information; and using the text information as the user-entered interaction sentence.

In some optional implementations of the embodiment, the human-machine interaction apparatus based on artificial intelligence further includes: an acquisition unit, configured for acquiring, before the determining whether to generate an interaction result corresponding to the interaction sentence, a search result corresponding to the interaction sentence in the search engine.

Figure 5:
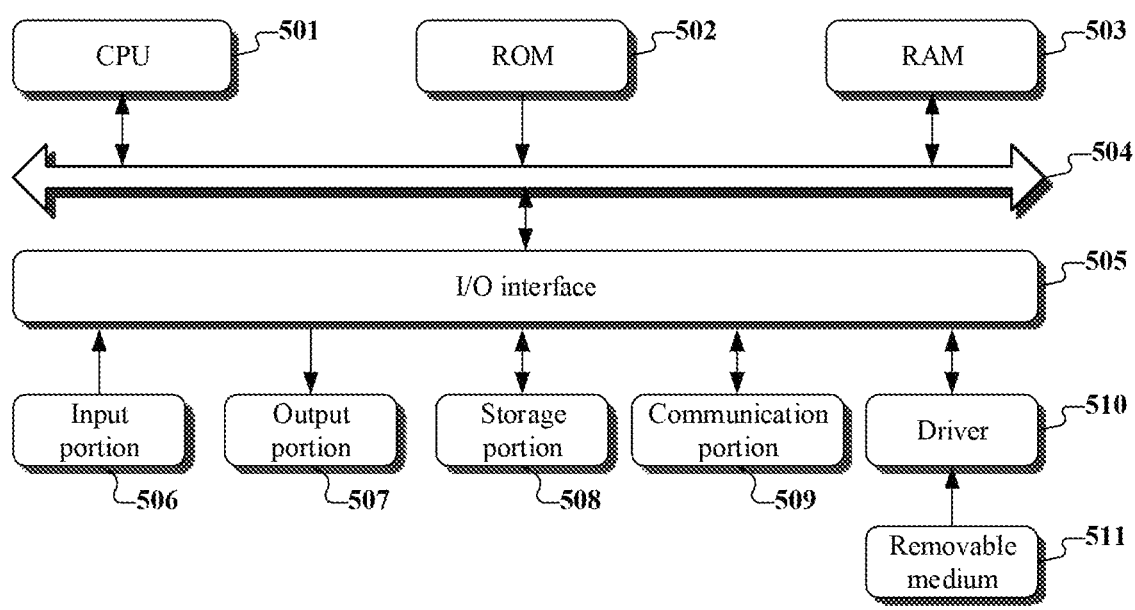
FIG. 5 is a structural schematic diagram of a computer system adapted to implement a terminal according to an embodiment of the disclosure.

FIG. 5 shows a structural schematic diagram of a computer system adapted to implement a terminal according to an embodiment of the disclosure. The terminal as shown in FIG. 5 is only an example, and is not a limitation to the functions and scope of application of the embodiments of the disclosure.

As shown in FIG. 5, the computer system includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the computer system. The CPU 501, the ROM 502 and the RAM 503 are connected to each other through a bus 504. An input/output (I/O) interface 505 is also connected to the bus 504.

The following components are connected to the I/O interface 505: an input portion 506; an output portion 507; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, the process described above according to embodiments of the present disclosure may be implemented in a computer software program. For example, an embodiment of the present disclosure includes a computer program product, which comprises a computer program that is embedded in a machine-readable medium. The computer program comprises instructions for executing the method as illustrated in the flow chart. The computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

The disclosure further provides a terminal, which may include the apparatus described in FIG. 4. The terminal may include one or more processors; and a memory for storing one or more programs, where the one or more programs may include instructions for executing the operations described in the steps 201-202. The one or more programs, when executed by the one or more processors, cause the one or more processors to execute the operations described in the steps 201-202.

The disclosure further provides a computer readable medium. The computer readable medium may be included in the terminal, or a stand-alone non-volatile computer readable medium not assembled into the terminal. The computer readable medium stores one or more programs, and the one or more programs, when executed by a terminal, cause the terminal to: receive a user-entered interaction sentence, and determine whether to generate an interaction result corresponding to the interaction sentence; and determine interaction information to be presented to the user based on a determining result, the interaction information including at least one of: the generated interaction result corresponding to the interaction sentence, or a search result corresponding to the interaction sentence in a search engine.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an interaction unit, and a determining unit, where the names of these units do not in some cases constitute a limitation to such units themselves. For example, the interaction unit may also be described as "a unit for receiving a user-entered interaction sentence, and determining whether to generate an interaction result corresponding to the interaction sentence."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A human-machine interaction method based on artificial intelligence, the method comprising:
setting a core-type database in a terminal, the core-type database including a navigation database or a control database, wherein the navigation database includes interaction information responsive to a sentence including a navigation instruction, and the control database includes interaction information responsive to a sentence including a control instruction;
receiving, by the terminal, a user-entered interaction sentence;
determining that the user-entered interaction sentence includes the navigation instruction or the control instruction;
searching locally in the terminal for interaction information responsive to the user-entered interaction sentence including the navigation instruction or the control instruction;
determining interaction information to be presented to a user based on a search result;
receiving by the terminal a second user-entered interaction sentence;
determining that the second user-entered interaction sentence does not include the navigation instruction and the control instruction;
sending the second user-entered interaction sentence that does not include the navigation instruction and the control instruction to a search engine remotely connected to the terminal arranged in a vehicle; and
obtaining by the search engine a second search result corresponding to the interaction sentence.

2. The method according to claim 1, wherein the navigation instruction is an instruction for navigating the vehicle, and the control instruction is an instruction for controlling the vehicle.

3. The method according to claim 2, wherein the user-entered interaction sentence includes the navigation instruction for navigating the vehicle,
wherein the searching locally in the terminal for interaction information responsive to the user-entered interaction sentence including the navigation instruction or the control instruction comprises: searching the navigation database arranged in the vehicle for the interaction information responsive to the user-entered interaction sentence including the navigation instruction.

4. The method according to claim 1, wherein the determining that the second user-entered interaction sentence does not include the navigation instruction and the control instruction comprises: determining that the second user-entered interaction sentence is a weather query; and
sending the second user-entered interaction sentence that does not include the navigation instruction and the control instruction to a search engine remotely connected to the terminal comprises: sending the weather query from the vehicle to the search engine remotely connected to the terminal of the vehicle.

5. A human-machine interaction apparatus based on artificial intelligence, the apparatus comprising:
  at least one processor; and
  a memory storing instructions, the instructions when executed by the at least one processor, cause the at least one processor to perform operations, the operations comprising:
  setting a core-type database in a terminal, the core-type database including a navigation database or a control database, wherein the navigation database includes interaction information responsive to a sentence including a navigation instruction, and the control database includes interaction information responsive to a sentence including a control instruction;
  receiving, by the terminal, a user-entered interaction sentence;
  determining that the user-entered interaction sentence includes the navigation instruction or the control instruction;
  searching locally in the terminal for interaction information responsive to the user-entered interaction sentence including the navigation instruction or the control instruction; and
  determining interaction information to be presented to a user based on a search result;
    receiving by the terminal a second user-entered interaction sentence;
    determining that the second user-entered interaction sentence does not include the navigation instruction and the control instruction;
  sending the second user-entered interaction sentence that does not include the navigation instruction and the control instruction to a search engine remotely connected to the terminal arranged in a vehicle; and
  obtaining by the search engine a second search result corresponding to the interaction sentence.

6. The apparatus according to claim 5, wherein the navigation instruction is an instruction for navigating the vehicle, and the control instruction is an instruction for controlling the vehicle.

7. The apparatus according to claim 6, wherein the user-entered interaction sentence includes the navigation instruction for navigating the vehicle,
  wherein the searching locally in the terminal for interaction information responsive to the user-entered interaction sentence including the navigation instruction or the control instruction comprises: searching the navigation database arranged in the vehicle for the interaction information responsive to the user-entered interaction sentence including the navigation instruction.

8. The apparatus according to claim 5, wherein the determining that the second user-entered interaction sentence does not include the navigation instruction and the control instruction comprises: determining that the second user-entered interaction sentence is a weather query; and
  sending the second user-entered interaction sentence that does not include the navigation instruction and the control instruction to a search engine remotely connected to the terminal comprises: sending the weather query from the vehicle to the search engine remotely connected to the terminal of the vehicle.

9. A non-transitory computer readable medium, storing a computer program, wherein the program, when executed by a processor, causes the processor to perform operations, the operations comprising:
  setting a core-type database in a terminal, the core-type database including a navigation database or a control database, wherein the navigation database includes interaction information responsive to a sentence including a navigation instruction, and the control database includes interaction information responsive to a sentence including a control instruction;
  receiving, by the terminal, a user-entered interaction sentence determining that the user-entered interaction sentence includes the navigation instruction or the control instruction;
  searching locally in the terminal for interaction information responsive to the user-entered interaction sentence including the navigation instruction or the control instruction; and
  determining interaction information to be presented to a user based on a search result;
    receiving by the terminal a second user-entered interaction sentence;
    determining that the second user-entered interaction sentence does not include the navigation instruction and the control instruction;
  sending the second user-entered interaction sentence that does not include the navigation instruction and the control instruction to a search engine remotely connected to the terminal arranged in a vehicle; and
  obtaining by the search engine a second search result corresponding to the interaction sentence.

\* \* \* \* \*